Feb. 4, 1964

K. G. KREUTER 3,120,240

AIR EJECTOR

Filed Aug. 10, 1961

INVENTOR.
KENNETH G. KREUTER

BY
Mead, Browne, Schuyler & Beveridge

ATTORNEYS

United States Patent Office 3,120,240
Patented Feb. 4, 1964

3,120,240
AIR EJECTOR
Kenneth G. Kreuter, Goshen, Ind., assignor to Robertshaw Controls Company, a corporation of Delaware
Filed Aug. 10, 1961, Ser. No. 130,530
2 Claims. (Cl. 137—210)

This invention relates to liquid storage systems of the type in which air and water, or other liquid, are intermittently delivered to an air-tight tank or reservoir by a pump, the liquid being kept under pressure by the compressed volume of air entrapped in the tank above the liquid, and more particularly to a device for releasing excess air from the tank as the liquid level varies.

In the case of a water storage system, as water is withdrawn from the tank, the air above the water expands as the water level is lowered thereby decreasing the pressure in the tank. When the pressure decreases to a predetermined level, a pressure responsive switch starts the pump which delivers more air and water to the tank. Without means to release some of the air already in the tank, it would eventually contain so much air that some would be discharged through supply pipes leading to a house or building from the tank or reservoir.

Accordingly, it is an object of this invention to prevent the accumulation of excess air in the tank of a liquid storage system.

A further object of this invention is to release excess air from the tank of a liquid storage system by means of a device which is simple in construction having a minimum number of parts, and which is economical to produce.

These objects are attained by the provision of a fitting having a passage therein which can be mounted in the wall of a tank to release excess air from the tank. A resilient grommet is mounted in the inlet of the passage and the air is released from the tank through the aperture in the grommet. A buoyant float member is pivotally mounted on the inner face of the fitting adjacent the inlet and is so constructed that the float member pivots upwardly to a position where a portion thereof seats against the grommet to prevent the escape of air from the tank, the remaining air being compressed above the liquid to pressurize the tank. As liquid is withdrawn from the tank, the float member pivots downwardly as the liquid level falls and uncovers the aperture in the grommet permitting air to be released from the tank through the passage. When the pressure in the tank falls to a predetermined level, a pressure responsive switch starts a pump which supplies additional air and water to the tank.

A further feature, which may be utilized, involves the provision of an adjustable valve in the passage for maintaining a pre-set minimum pressure in the tank.

Figure 1:
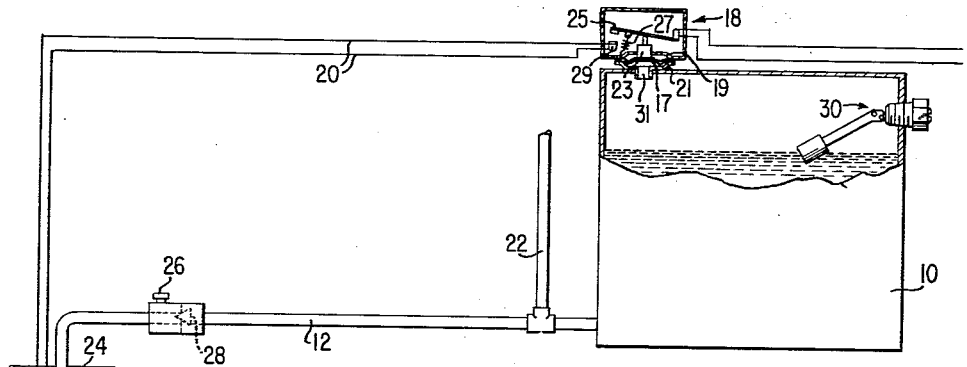
Figure 3:
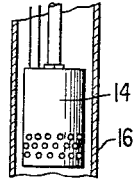
Figure 3:
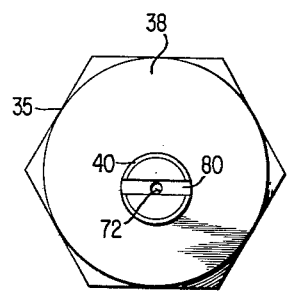
Figure 2:
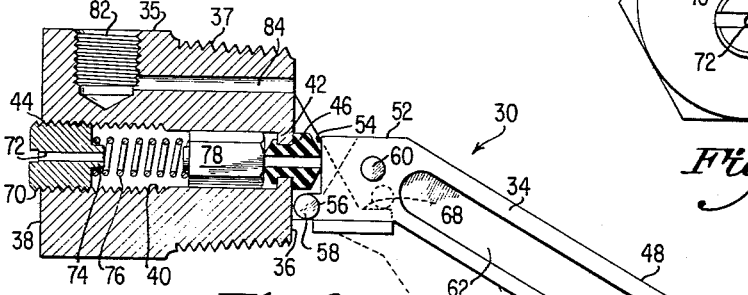
Figure 4:
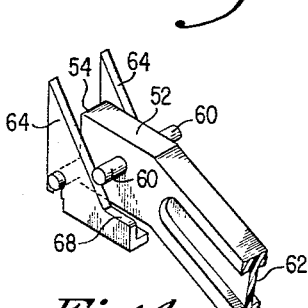

A specific embodiment of the invention will now be described in connection with the accompanying drawings wherein:

FIG. 1 is a diagrammatic sketch of a water storage system;
FIG. 2 is a sectional elevation of the air ejector;
FIG. 3 is an end view of the device of FIG. 2; and
FIG. 4 is a detailed perspective view illustrating the mounting of the float member.

Referring to FIG. 1, a water storage system is illustrated comprising an enclosed, air-tight storage tank 10. Tank 10 is connected by means of a supply pipe 12 with a submersible pump 14 disposed in a well casing 16. The submersible pump 14 is controlled by a pressure switch 18 mounted on storage tank 10 which turns the pump on and off in response to pressure conditions in the tank 10. Switch 18 is connected with the pump 14 by means of electrical cables 20. A water supply pipe 22 intersects supply pipe 12 for supplying water from tank 10 to a faucet or hydrant located in a building, for example. Mounted in supply pipe 12 above the pump 14 is a bleeder valve 24. Also mounted in supply pipe 12 is an air check valve 26 (commonly known as a snifter valve) and a check valve 28.

Pressure switch 18 may be of any well known construction, the specific details thereof forming no part of this invention. For purposes of illustration, however, the pressure actuated switch 18 may comprise a diaphragm 17 clamped at its periphery between a pair of casing members 19 and 21. A switch actuating stem 23 is in engagement with the central portion of diaphragm 21 for slidable movement through an aperture in casing member 19. A movable contact 25 is biased toward engagement with a fixed contact 29 by means of a spring 27. The lower side of diaphragm 17 is exposed, through a connection 31, to the pressure in tank 10. Accordingly, when the pressure in tank 10 falls, contact 25 will move into engagement with contact 29 to close the circuit to pump 14. As the tank pressure rises, diaphragm 17 will move stem 23 up into engagement with movable contact 25 to move it away from contact 29 against the bias of spring 27 to interrupt the circuit to the pump.

In operation, when the pump is causing running water to flow through supply pipe 12 to tank 10, the water pressure causes the bleeder valve 24 and the snifter valve 26 to close, and check valve 28 to open, and water is delivered to the storage tank. When the pump shuts off, check valve 28 closes and the water upstream therefrom bleeds out through the bleeder valve into the well casing 16, and the snifter valve 26 returns to the open position letting air into the pipe 12 to replace the water. Thus, when the pump 14 starts up again, the air trapped in pipe 12 is delivered to the storage tank 10. As the water level rises in the storage tank 10, the air is entrapped above the water and is compressed thereby to pressurize the tank. If an excessive amount of air is introduced into the tank, some of it would be discharged through supply pipe 22, which would be undesirable. Accordingly, an air ejector 30 is mounted in the storage tank 10 to release excess air therefrom.

Referring now to FIG. 2, the air ejector 30 comprises a fitting 32 and a buoyant float member 34 pivotally mounted thereon. Fitting 32 has an externally threaded portion 37 and a hexagonal head portion 35. The threaded portion 34 serves to mount the fitting into a threaded opening in the wall of the storage tank. Head portion 35 may be engaged by an appropriate tool for this purpose.

Fitting 32 has a forward or inner face 36, and a rear or outer face 38. Formed in fitting 32 is a cylindrical passage 40 having a reduced inlet 42 and an outlet 44. Mounted on the annular shoulder provided by reduced inlet 42 is a resilient grommet 46. The aperture in grommet 46 provides an inlet passage for the passage of air from the interior of storage tank 10 to the exterior thereof through passage 40. The grommet 46 also serves as a resilient valve seat as will be described below.

The float member 34 is pivotally mounted on the inner face 36 of fitting 32 and comprises a lever 48 and a float element 50 formed integrally on one end thereof. The float member 34 comprises a unitary piece of molded plastic having a density less than that of water. Accordingly, float element 50 is a solid piece of buoyant plastic material and is integrally molded with lever 48. Float element 50 is preferably cylindrical in shape and of such size that it can be inserted through the threaded opening in the wall of tank 10. A mounting element 52 is integrally formed at the opposite end of lever 48 from float element 50. In the preferred form, mounting element 52 is angularly disposed with respect to the longitudinal axis of lever 48. The end 54 of mounting element 52 remote from lever 48 defines a valve element in the form of a plane face for a purpose to be described below.

Projecting from the lower edge of end 54 is a shoulder 56. Formed on shoulder 56 and projecting laterally from each side thereof is a cylindrical pin member 58. Formed intermediate the upper and lower edges of mounting element 52 is a pair of cylindrical pin members 60 projecting laterally from each side of mounting element 52. Depressions 62 may be formed in arm member 48 to reduce the amount of material required.

Mounted on the inner face 36 of fitting 32 is a pair of bracket elements 64. Bracket elements 64 are mounted one on each side of grommet 46 and are joined to fitting 32 by means of welding, brazing or other conventional means. A keyhole slot 66 is formed in each bracket element 64, and pin members 58 of float member 34 are snapped into position in the keyhole slots 66 in order to pivotally mount the float member 34 onto the fitting 32. A shoulder 68 is formed on each bracket element 64 and cooperates with pin members 60 to limit the downward travel of the float member 34, as illustrated by the broken lines in FIG. 2.

The operation of the device heretofore described is as follows:

Starting with the tank 10 empty, the pump 14 is started in operation. The air that is entrapped in the pipe 12 between the pump and the snifter valve 26 is forced into the tank 10 by the pump, after which water enters the tank through the pipe 12. As the water level in the tank rises, it will tend to compress the air in the tank above the water. As the air is compressed, it escapes through the grommet 46 and passage 40, since the weight of the float element 50 keeps lever 34 in the lower position in which the valve portion 54 is unseated from the grommet 46. The water level continues to rise until it reaches the float element 50, whereupon it lifts the float element until the valve portion 54 seats against the grommet preventing any further escape of air. The pump continues to supply water until a pressure is reached that will cause switch 18 to open and shut down the pump. Thereafter, until the pump is started again, the compressed air which at the end of each pump actuation has a given volume and pressure, will deliver water through pipe 22 at a uniform pressure. As water is withdrawn from the tank and delivered to the system through pipe 22, the float element 50 follows the falling water level, and valve portion 54 is moved away from grommet 46 permitting air to escape. The escape of air through the passage and corresponding expansion of the air due to the falling water level causes the pressure to drop until switch 18 closes to again actuate the pump to supply additional air and water to the tank.

In order to maintain a minimum pressure in the tank at all times so that regardless of the water level, adequate pressure will be maintained in the supply pipe 22, a minimum pressure relief valve may be provided in fitting 32. An adjusting nut 70 having an aperture 72 therethrough is threadedly mounted in passage 40. A boss 74 is formed on the inner face of adjusting nut 70, and a spring 76 has one end supported on boss 74. Slidably mounted in passage 40 is a non-circular valve element 78. The other end of spring 76 is mounted on valve element 78 and urges it into engagement with the inner side of grommet 46. Thus, when the water level is low in the tank, no air can escape through the passage 40 unless the tank pressure is sufficient to move valve element 78 away from grommet 46 to permit air to flow through the passage. The space between the flat walls of valve element 78 and the cylindrical wall of passage 40 permit free flow of air past valve element 78 and out of the passage through aperture 72.

A tapped hole 82 may be provided in fitting 32 in communication with a passage 84 for mounting a pressure gauge on the fitting for observing the tank pressure. A screw driver slot 80 is provided on the outer end of adjusting nut for adjusting the compression of spring 76 and thus the biasing force applied to valve element 78. Thus, if the pressure at which air is released is less than desired, adjusting nut 70 can be turned to further compress spring 76 to increase the force on valve element 78 until the pressure is maintained at the desired level. Then, with the water level such that float element 50 is pivoted downward so that valve portion 54 is spaced from grommet 46, rising water level will compress the air in the tank until the pressure is sufficient to unseat valve element 78 whereupon air will escape until the water moves float element 50 upward to seat valve portion 54. No air can escape thereafter, and the water will rise only until the pressure switch responds to shut off the pump. Valve element 78 further prevents a complete loss of pressure in the event the tank is drained upon the occurrence of a power failure.

While a specific embodiment of the invention has been described for purposes of illustration, various modifications will be apparent to those skilled in the art without departing from the scope of the invention as defined by the appended claims.

What I claim is:

1. In a liquid storage system including an enclosed tank and means for intermittently supplying liquid and air to the tank in response to pressure conditions in the tank, an air ejector comprising a fitting for mounting the ejector in the tank wall with a passage in said fitting having an inlet within the tank and an outlet outside the tank, a resilient grommet mounted in the inlet end of said passage with a portion inside the passage defining an inner valve seat and a portion extending outside the passage defining an outer valve seat, stop means adjustably mounted in said passage, a valve element slidably mounted in said passage, resilient biasing means between said stop means and said non-circular valve element urging said non-circular valve element toward engagement with said inner valve seat to shut off the flow through said passage, a lever pivotally mounted on said fitting adjacent said inlet with a float element on one end thereof, the opposite end of said lever defining a plane faced valve element for engaging said outer valve to seat to close said passage, said float element being movable in response to variations in the liquid level in the tank between an upper position in which the plane face of said valve element is seated against said outer valve seat to prevent flow of air from the tank and lower positions in which the plane face of said valve element is spaced from said seat, said slidable valve element being movable in response to an increase in pressure in the tank against said biasing means permitting flow through said passage when said valve element is spaced from said outer valve seat.

2. An air ejector for releasing excess air from an enclosed liquid storage tank comprising a fitting adapted to be mounted in the wall of a tank, a cylindrical passage in said fitting having an inlet and an outlet, a resilient grommet in said inlet having a portion defining an inner valve seat within said passage and a portion extending outside said passage defining an outer valve seat, an apertured stop nut threadedly received in the outlet end of said passage, a non-circular valve element slidably received in said passage, a resilient spring between said stop nut and said non-circular valve element for urging said non-circular valve element into engagement with said inner valve seat, a lever pivotally mounted on said fitting adjacent said inlet having an integral plane faced valve portion engageable with said outer valve seat and a float element on the end thereof, whereby said non-circular valve element is movable against the biasing force of said spring to a position spaced from said inner valve seat and said float element is pivotally movable between an upper position in which said valve portion engages said outer valve seat and lower positions in which said valve portion is spaced therefrom.

References Cited in the file of this patent

UNITED STATES PATENTS

| | | |
|---|---|---|
| 386,242 | Fry | July 17, 1888 |
| 806,331 | Ferry | Dec. 5, 1905 |
| 925,859 | Axford | June 22, 1909 |
| 1,997,879 | Watry | Apr. 16, 1935 |
| 2,658,518 | Harland | Nov. 10, 1953 |
| 2,868,460 | Hansen | Jan. 13, 1959 |
| 2,990,842 | Good | July 4, 1961 |

FOREIGN PATENTS

| | | |
|---|---|---|
| 121,770 | Great Britain | Jan. 9, 1919 |
| 560,771 | Italy | Apr. 10, 1957 |